United States Patent Office 3,317,491
Patented May 2, 1967

3,317,491
NOVEL CRUDE RUBBERS CONTAINING METAL OXIDE CURE AGENTS, PROCESS FOR CURING SUCH COMPOSITIONS, AND VULCANIZATES OBTAINED THEREBY
Gaylord A. Kanavel, Yardley, Pa., assignor to Thiokol Chemical Corporation, Bristol, Pa., a corporation of Delaware
No Drawing. Filed Aug. 11, 1964, Ser. No. 388,936
18 Claims. (Cl. 260—79.5)

The present invention relates to novel, curable acrylate polymer based crude rubber compositions and to the process for curing such compositions. More particularly, this invention relates to the novel, curable crude rubber compositions formed by admixture of certain metal oxides and interpolymers of lower alkyl acrylate esters and olefin-epoxy monomers, the process for curing such compositions and it also relates to the vulcanizates thereby obtained.

Acrylate interpolymers are known in the art and they may be cured with a variety of curing agents to form elastomeric products. The vulcanizates based on acrylate polymers which have been devised to date, however, have certain limitations in regard to tensile strength and scorch resistance properties. Good tensile strength properties are needed in vulcanizates that are to be used in fabricating items such as mechanical goods and heat and oil resistant hosing. For processing safety it is desirable to have as high a resistance to scorch as possible.

An object of the present invention is to provide novel, curable, acrylate polymer based compositions.

Another object of the present invention is to provide a novel process for the cure of acrylate elastomers.

A further object of the present invention is to provide novel acrylate based vulcanizates which have unusually high tensile strengths and good scorch resistance properties.

It has been unexpectedly found, according to the present invention, that novel and improved acrylate polymer based crude rubber compositions are provided by the use, as the curing agent, of one or more of certain metal oxides when such curing agents are used with acrylate based interpolymers containing a major portion of acrylate monomers and a minor proportion, of the order of about 0.5% to 10% by weight, of olefin-epoxide monomers. Upon cure, novel vulvanizates may be produced from the crude rubber compositions of the present invention which are elastomers and which have tensile strengths up to 2200 to 2700 or more p.s.i. and scorch resistance of 30+ minutes at 280 or more degrees F.

The curing agents which may be used, according to the present invention to cure the acrylate elastomers described herein are metal oxide materials. The preferred oxides are those of the metals lead, zinc, magnesium and calcium. The most preferred of these metal oxides are $Pb_3O_4$ and $PbO$.

When used according to the present invention, the metal oxide curing agents are used in amounts of about 1 to 15% by weight per 100 parts by weight of the acrylate polymer being cured therewith. The curing of the polymer is usually conducted at temperatures of about 300 to 360° F. in about 5 to 60 minutes. The lower curing temperatures usually require the longer curing times.

It has also been found, according to the present invention, that the use of certain activators in combination with the metal oxide cure agents will provide faster cure cycles and lower scorch resistances than would be available by use of the metal oxide curing agent above. These activators are compounds which have a thiourea type grouping, i.e.,

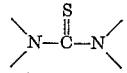

These activators include thiourea, ethylthiourea, diethylthiourea, n-dibutylthiourea, tert.-butyl thiourea, thiosemicarbazide, dicyclohexylthiourea, cyclohexylthiourea, cyclohexylthiourea, trimethylthiourea, n-hexamethylene sym-bis(cyclohexylthiourea), ethylene sym-bis(tert.-butylthiourea) and ethylene thiourea. The preferred of these activators is ethylene thiourea. Up to about 5% by weight of the activators may be used, based on the weight of elastomer used, according to the present invention.

The metal oxide curing agents may also be used in combination with other curing agents, such as amine type curing agent, and either with or without the activators disclosed above to provide a variety of process curing conditions and product physical properties.

In general, the interpolymers useful in the practice of this invention are produced by free radical polymerization of about 60 to 99.5 weight percent of lower alkyl acrylate esters, with up to about 30 weight percent of acrylonitrile, with about 0.5 to 10 weight percent of olefin-epoxide monomers and with up to 1.5 weight percent of polyene monomers. Conventional peroxide, persulfate, or azo type initiators may be used in the interpolymerization process. Benzoyl peroxide and azobisisobutyronitrile are the preferred initiators. The monomers may be polymerized using solution, suspension, emulsion, of bulk polymerization methods. The initiator may be added to the monomers either in a single charge, or in increments, or continuously, to initiate polymeriaztion. Adjuvants commonly used in acrylate polymerization procedures may also be added during the reaction period such as suspending agents, which often prove useful in suspension procedures to facilitate handling or processing the reaction product. The order of addition of monomers, initators and adjuvants to the reaction system is as is usually employed in the art for the specific polymerization technique chosen. Polymerization is facilitated by heating and agitation and proceeds until the desired solid interpolymers have formed. The preferred method is aqueous suspension polymerization. The interpolymerization may be conducted in about 2 to 5 hours at about 80 to 100° C.

The lower alkyl acrylates which are usefully employed in the present invention are esters of acrylic acid and the lower alkanols. These acrylate esters may be used singly or in combination with one another to make up from about 60 to 99.5 weight percent of the total monomer charge in the interpolymerization process. Of the lower alkanols, both normal and branched chain alcohols may be used, and preferably those which have up to a total of about 8 carbon atoms per molecule. Thus, preferred acrylates formed therefrom and useful herein have either normal or branch-chained alkyl ester groups, and include in their number ethyl acrylate, propyl acrylate, isopropyl acrylate, n-butyl acrylate, isobutyl acrylate, sec.-butyl acrylate, tert.-butyl acrylate, and the isomeric forms of pentyl, hexyl, heptyl and octyl acrylates, and in the latter instance most preferably 2-ethylhexyl acrylate.

Acrylonitrile may be used to replace a portion of the lower alkyl acrylate esters ordinarily employed herein, and in quantities of up to 30 weight percent of the total of monomers charged. Acrylonitrile, where used, has the effect of imparting to the elastomeric vulcanizates produced therewith a somewhat greater hardness, higher torsional modulus G10,000 temperature, and increased solvent swell resistance to the action of oils than do vulcanizates produced from otherwise identical interpolymers containing no acrylonitrile.

The polyene monomers also may be used to replace a portion of the lower alkyl acrylate esters ordinarily employed herein and in quantities of up to 1.5 percent by weight of the total of monomers charged to prepare the present interpolymers. They are monomeric materials containing at least two carbon-to-carbon double bond linkages and may contain from two to four vinyl and/or allylic unsaturated groups per molecule. Mixed polyene monomers may be used which contain both vinyl and allylic groups. Polyene monomers tend to increase the Mooney viscosity values of interpolymers formed therewith. The present polyenes are distinguished from the broad class of polyolefin monomers in that the reactive unsaturated groups within any one molecule are not in immediate conjugate position with respect to one another, that is to say the reactive groups are separated by at least one atom. The non-conjugated double bonds of the present polyene monomers are separated by some intervening chemical structure which is inert to reaction with epoxide groups, the nature of which may vary widely from say a sulfur, an oxygen, a polymethylene, or a neopentyl group to an aromatic, an alkyl, or an amido group, etc., and for the purposes of this invention not appreciably detract from the novel qualities desired in the present interpolymers formed therewith. Typical polyene monomers which may be used in accordance with the teachings of the present invention are listed in U.S. 2,340,111.

Table I presents representative polyene monomers having allylic unsaturation which may be used in accordance with the teachings of the present invention. These are designated hereinafter as allylic polyene monomers.

TABLE I

Diene monomers allyl beta-allyloxypropionate
diallyl ether
allyl diglycol carbonate
allyl glycol ether
diallyl adipate
diallyl azelate
diallyl carbonate
diallyl diglycolate
diallyl isosebacate
diallyl homophthalate
diallyl malonate
diallyl nadic ester
trimethylol propane diallyl ether
diallyl oxalate
diallyl phthalate
diallyl isophthalate
diallyl terephthalate
diallyl sebacate
diallyl suberate
diallyl succinate
diallyl sulfide

Triene monomers trimethylol propane triallyl ether
triallyl aconitate
triallyl citrate
triallyl cyanurate
triallyl phosphate

Tetraene monomers pentaerythritol tetraallyl ether

Table II presents some representative vinyl polyene monomers of the acrylate type which may be usefully employed in the present invention.

TABLE II

Diene monomers acrylic anhydride
ethylene diacrylate
tetramethylene diacrylate
2-butene-1,4 diol diacrylate
ethylene glycol-2,2'-diacyanoacrylate
neopentyl glycol-2,2'-dicyanoacrylate

Triene monomers glyceryl triacrylate

Table III presents some representative vinyl polyene monomers of the methacrylate type which may be usefully employed in the present invention.

TABLE III

Diene monomers

Bisphenol "A" dimethacrylate
2,4-dimethyhexanediol-2,5-dimethacrylate
ethylene dimethacrylate
methacrylic anhydride
neopentyl glycol dimethacrylate
tetramethylene dimethacrylate
triethylene glycol dimethacrylate
dimethyl propane dimethacrylate
diethylene glycol dimethacrylate
butyne dimethacrylate
cyclohexane dimethanol dimethacrylate
butene dimethacrylate
butane dimethacrylate

Triene monomers glyceryl trimethacrylate
trimethylol propane trimethacrylate
trimethacrylate of isocyanurate

Tetraene monomers pentaerythritol tetramethacrylate

Table IV presents some other representative vinyl polyene monomers which may be usefully employed in the present invention.

TABLE IV

Diene monomers 2,5-dimethylhexadiene-1,5
divinyl benzene
divinyl sulfide
divinyl sulfone
divinyl oxalate
N,N-methylene-bis-acrylamide Table V presents some representative polyene monomers of mixed types, that is those polyenes which contain at least one unsaturated group from at least two of the types of unsaturated groups found useful according to the present invention.

TABLE V

Mixed allylic and vinyl diene monomers allyl acrylate
allyl methacrylate
N-allyl acrylamide
allyl methacrylamide
methallyl acrylate
methallyl methacrylate
vinyl acrylate
vinyl methacrylate
allyl vinyl ether

Mixed allylic and vinyl triene monomers

N,N-diallylacrylamide
N,N-dimethallylacrylamide
diallyl itaconate

The preferred polyene monomers for use in accordance with the present invention are allyl methacrylate and allyl acrylate.

The olefin-epoxide monomers useful for the preparation of the acrylate interpolymers to be used in accordance with the present invention are substances which contain at least one polymerizable carbon-to-carbon double bond either of a terminal type, viz. $CH_2\!=\!C\!<$, and/or of an internal type, viz. $>\!C\!=\!C\!<$. These groups will hereinafter be termed olefin radicals. The olefin-epoxide monomers also contain at least one epoxide radical, viz.

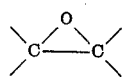

The olefin and epoxide radicals of the monomers may be joined by some intervening chemical structure which is inert to reaction with epoxide groups, the nature of which may vary widely, such as was previously described, and and still not appreciably detract for the novel qualities desired in the present interpolymers formed therewith.

Several methods may be used to prepare useful olefin-epoxide monomers. One method is by the partial epoxidation of polyene monomers, such as those which are described in Tables I to V above. By "partial epoxidation" is meant that only some of the olefin radicals present in the polyene monomers are epoxidized, leaving intact at least one reactive carbon-to-carbon double bond linkage per molecule. This may be accomplished by use of epoxidation methods commonly known to the arts, such as by the Prileschajew reaction, i.e., epoxidation through the action of an organic peracid, such as perbenzoic, peracetic, perphthalic or performic acids on only some of the olefin radicals in the polyene monomers. Olefinepoxide monomers which may be used in accordance with the present invention include dicyclopentadiene monoepoxide, pyran monoepoxide, 4-vinylcyclohexane monoepoxide, isoprene monoepoxide, butadiene monoepoxide and p-epoxy ethyl styrene. Mixed ethers of polymerizable unsaturated alcohols and epoxy alcohols such as vinyl glycidyl ether, allyl glycidyl ether, methallyl glycidyl ether, the methyl vinyl carbinyl ether of beta phenyl glycidol, the allyl ether of beta methyl glycidol, and others such as are disclosed in U.S. Patent 2,314,039 may also be used in olefinepoxide monomers. Useful ester-type olefin-epoxide monomers may be formed by esterification of epoxy alcohols by polymerizable unsaturated acids, such as acrylic, methacrylic, itaconic, fumaric, maleic acids, etc.; conversely, epoxy acids such as glycidyl acid may be esterified with polymerizable unsaturated alcohols to form such ester-type olefin-epoxide monomers. Allyl glycidyl ether, glycidyl acrylate and glycidyl methacrylate are the preferred olefin-epoxide monomers.

Oelfin-epoxide monomers, either singly or in mixture, may be used in quantities of about 0.5 to 10 percent by weight of monomer charge to prepare the present interpolymer. Even such minor quantities as one percent of olefin-epoxide monomers are effective in providing sufficient intact epoxide groups in the interpolymers formed therewith to permit cure with the organic curing agents described above.

The curable compositions of the present invention may contain, in addition to the acrylate elastomers, curing agents and activators described above, optional materials which are commonly employed in the acrylate rubber art. Such optional materials would include fillers such as carbon black and lubricant such as stearic acid, lanolin and plasticized petroleum wax, antioxidants such as polymerized trimethyl dihydroquinoline and plasticizers such as dibutyl carbitol adipate.

The following examples are merely illustrative of the present invention and are not intended as a limitation upon the scope thereof.

EXAMPLE 1

An interpolymer was formed from 97 parts by weight of ethyl acrylate, 3 parts by weight of allyl glycidyl ether and 0.05 part by weight of allyl methacrylate as disclosed in Example 3 of U.S. patent application S.N. 319,641, filed Oct. 29, 1963, in the name of George Rosen, and entitled "Interpolymers of Lower Alkyl Acrylate Esters, Olefin-Epoxide Monomers and Polyene Monomers." The polymerization was conducted in a solution of polyacrylic acid (alcogum) in tap water at reflux temperatures using a total of about 9 grams of azobisisobutyronitrile as the polymerization initiator. The initiator was used in six aliquot incremental charges, dissolved in benzene, at intervals of about 22 minutes.

EXAMPLE 2

An ethyl acrylate/polyene/olefin-epoxy interpolymer prepared as in Example 1 was cured, according to the present invention, with various metal oxide curing agents. Activators were also used in some cases. General cure formulations were employed. The formulations were cured at 320° F. for 30 minutes and subsequently tempered for 5 hours at 350° F. before the physical properties of the cured samples were ascertained. The cure formulations employed and the physical property results obtained on the cured formulations are listed below.

| Formulation | 1 | 2 | 3 | 4 | 5 | 6 |
|---|---|---|---|---|---|---|
| Interpolymer | 200 | 200 | 200 | 200 | 200 | 200 |
| Stearic acid | 2 | 2 | 2 | 2 | 2 | 2 |
| Philblack A Carbon black | 120 | 120 | 120 | 120 | 120 | 120 |
| Agerite Resin D (polymerized trimethyl dihydro quinoline) | 3 | 3 | 3 | 3 | 3 | 3 |
| Red lead ($Pb_3O_4$) | 10 | | | 10 | | |
| ZnO | | 10 | | | 10 | |
| MgO | | | 10 | | | 10 |
| Na-22 (ethylene thiourea) | | | | 1 | 1 | 1 |
| Mooney Scorch at 350° F. (minutes): | | | | | | |
| 4' | 16 | 30+ | 30+ | 13 | 30+ | 30+ |
| 10' | 21 | 30+ | 30+ | 17 | 30+ | 30+ |
| Tensile, p.s.i. | 2,200 | 1,110 | 700 | 2,270 | 1,340 | 900 |
| Elongation, percent | 125 | 330 | 475 | 205 | 350 | 530 |
| Shore A hardness | 77 | 69 | 68 | 74 | 65 | 63 |

EXAMPLE 3

A polymer prepared as in Example 1 was cured in several plasticized cure formulations according to the present invention. The formulations were cured for 60 minutes at 300° F. and tempered for 24 hours at 300° F. before the physical properties of the cured samples were ascertained. The cure formulations employed and the physical properties obtained on these cured formulations are listed below.

| Formulation | 1 | 2 | 3 | 4 |
|---|---|---|---|---|
| Interpolymer | 60 | 100 | 100 | 100 |
| Stearic acid | 2 | 2 | 2 | 2 |
| Agerite Resin D | 1.5 | 1.5 | 1.5 | 1.5 |
| Philblack A carbon black | 50 | | 50 | |
| Philblack E carbon black | | 40 | | 40 |
| Dibutyl carbitol adipate | 5 | 5 | 5 | 5 |
| Red lead ($Pb_3O_4$) | 5 | 5 | 5 | 5 |
| Na-22 (ethylene thiourea) | 0.5 | 0.5 | 1 | 1 |
| Mooney Scorch at 300° F. (minutes): | | | | |
| 4' | 29 | 30+ | about 12 | about 11 |
| 10' | 30+ | 30+ | about 17 | about 16 |
| Tensile, p.s.i. | 2,000 | 2,500 | 2,110 | 2,800 |
| Elongation, % | 260 | 365 | 300 | 375 |
| Shore A hardness | 65 | 71 | 71 | 70 |

EXAMPLE 4

A polymer produced as in Example 1 was cured in several cure formulations according to the present invention. Good physical properties were obtained on the cured materials. The formulations used and the Mooney scorch properties of the formulations are listed below.

| Formulation | 1 | 2 | 3 | 4 | 5 | 6 |
|---|---|---|---|---|---|---|
| Interpolymer | 400 | 400 | 400 | 400 | 400 | 400 |
| Stearic acid | 4 | 4 | 4 | 4 | 4 | 4 |
| Philblack A carbon black | 240 | 240 | 240 | 240 | 240 | 240 |
| Agerite Resin D | 6 | 6 | 6 | 6 | 6 | 6 |
| Red Lead (Pb$_3$O$_4$) | 20 | 20 | 20 | | | |
| Lithage (PbO) | | | | 20 | 20 | 20 |
| Na-22 (ethylene thiourea) | 1 | 2 | 4 | 1 | 2 | 4 |
| Mooney scorch at 280° F. (minutes): | | | | | | |
| 4' | 30+ | 30+ | 11 | 30+ | 29+ | 24 |
| 10' | 30+ | 30+ | 17 | 30+ | 30+ | 30+ |

Attempts to cure the interpolymer of claim 1 with ethylene thiourea, in the absence of the metal oxide curing agents of the present invention, were unsuccessful.

I claim:
1. A curable composition comprising a curable polyacrylate interpolymer which contains vicinal epoxide groups and as a curing agent for said interpolymer, at least one metal oxide selected from the group consisting of the oxides of lead, zinc, magnesium and calcium.
2. A curable composition as in claim 1 which contains about 1 to 15% by weight of said curing agent per 100 parts by weight of said interpolymer.
3. A curable composition as in claim 1 in which said interpolymer is formed from a polymerizable monomer charge which comprises about 0.5 to 10% by weight of at least one olefin epoxide monomer and about 60 to 99.5% by weight of at least one lower alkyl acrylate ester.
4. A curable composition as in claim 1 in which said interpolymer is formed from a polymerizable monomer charge which comprises 0.5 to 10% by weight of at least one olefin epoxide monomer, about 60 to 99.5% by weight of at least one lower alkyl acrylate ester, up to about 30% by weight of acrylonitrile and up to about 1.5% by weight of at least one polyene monomer.
5. A curable composition as in claim 1 in which said curing agent is an oxide of lead.
6. A curable composition as in claim 5 in which said curing agent is PbO.
7. A curable composition as in claim 5 in which said curing agent is Pb$_3$O$_4$.
8. A curable composition as in claim 1 in which said curing agent is an oxide of zinc.
9. A curable composition as in claim 8 in which said curing agent is ZnO.
10. A curable composition as in claim 1 in which said curing agent is an oxide of magnesium.
11. A curable composition as in claim 10 in which said curing agent is MgO.
12. A curable composition as in claim 2 which further comprises up to about 5 parts by weight of an activator per 100 parts by weight of said interpolymer, said activator having the grouping

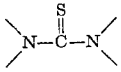

13. A curable composition as in claim 12 in which said activator is ethylene thiourea.
14. A curable composition comprising, in weight ratio,
(a) 100 parts by weight of an acrylate interpolymer which contain vicinal epoxide groups formed from a polymerizable monomer charge which comprises about 0.5 to 10% by weight of at least one olefin epoxide monomer and about 60 to 99.5% by weight of at least one lower alkyl acrylate ester, up to about 30% by weight of acrylonitrile and up to about 1.5% by weight of at least one polyene monomer,
(b) about 1 to 15 parts by weight of at least one curing agent which is an oxide of a metal selected from the group consisting of lead, zinc, magnesium and calcium and,
(c) up to about 5 parts by weight of ethylene thiourea.
15. A process which comprises curing an acrylate elastomer which contain vicinal epoxide groups with at least one curing agent, which is selected from oxides of the meals lead, zinc, magnesium and calcium, said elastomer being formed from a polymerizable monomer charge which comprises about 0.5 to 10% by weight of at least one olefin epoxide monomer and about 60 to 99.5% by weight of at least one lower alkyl acrylate ester.
16. A process as in claim 15 in which about 1 to 15% by weight of said curing agent is used per 100 parts by weight of said elastomer.
17. A process as in claim 16 which is conducted in the presence of up to about 5 parts by weight of ethylene thiourea.
18. A process as in claim 15 which comprises curing said elastomer with said curing agent in about 5 to 60 minutes at a temperature of about 300 to 360° F.

References Cited by the Examiner

UNITED STATES PATENTS

| | | | |
|---|---|---|---|
| 2,600,414 | 6/1952 | Mast et al. | 260—79.5 |
| 2,839,514 | 7/1958 | Shokal et al. | 260—80.5 |
| 3,026,305 | 3/1962 | Robinson | 260—79.5 |
| 3,127,379 | 3/1964 | Natta et al. | 260—79.5 |
| 3,201,497 | 8/1965 | Heino | 260—80.5 |
| 3,265,672 | 8/1966 | Pariser et al. | 260—79.7 |

JOSEPH L. SCHOFER, *Primary Examiner.*

D. K. DENENBERG, *Assistant Examiner.*